United States Patent Office 3,107,717
Patented Oct. 22, 1963

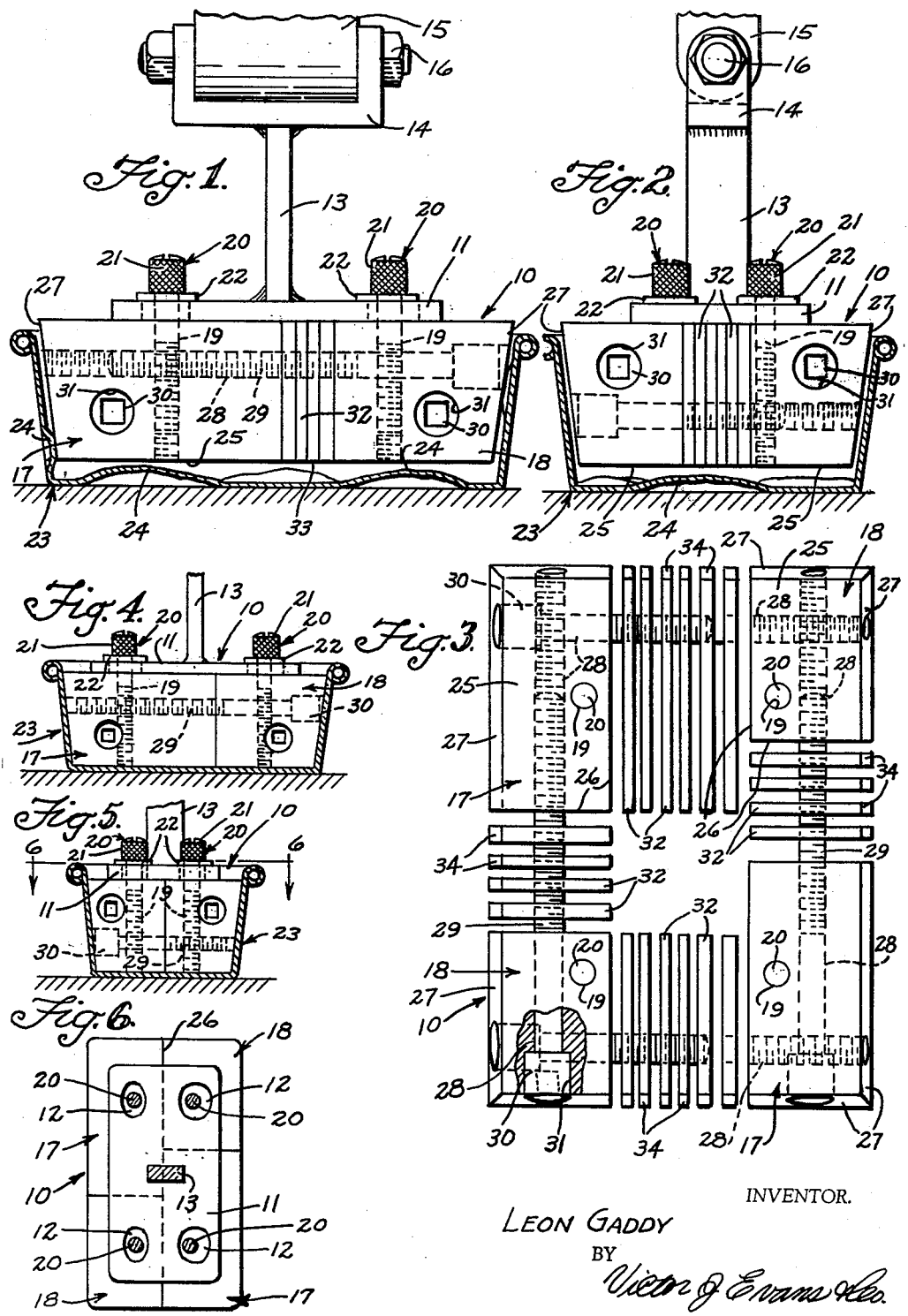

3,107,717
ADJUSTABLE DIE
Leon Gaddy, 528 N. 4th St., Garland, Tex.
Filed Mar. 6, 1959, Ser. No. 797,690
2 Claims. (Cl. 153—48)

This invention relates to an adjustable die, and more particularly to and adjustable die for use in straightening out pans such as baking pans.

The object of the invention is to provide an adjustable die which is adapted to be connected to a suitable mechanism such as a press, whereby bent portions of a pan such as a bread or bakery pan can be readily straightened out so that the pan can be used over and over again.

Another object of the invention is to provide a die which is adapted to be connected to a suitable conventional press, and wherein the die is adjustable so that it will fit in pans of different sizes or shapes which are to be straightened out, there being a highly convenient means provided for adjusting the position of the parts of the die.

A further object of the invention is to provide an adjustable die which is extremely simple and inexpensive to manufacture.

Other objects and advantages will be apparent during the course of the following description.

In the accompanying drawings, forming a part of this application, and in which like numerals are used to designate like parts throughout the same:

FIGURE 1 is a side elevational view of the adjustable die of the present invention, and showing the die attached to a press, and illustrating a pan in the process of being straightened, FIGURE 1 also showing the pan having certain bent portions therein.

FIGURE 2 is a view similar to FIGURE 1 but taken at right angles thereto.

FIGURE 3 is a bottom plan view of the die, with parts broken away and in section and showing the parts in expanded position.

FIGURE 4 is a side elevational view, with parts broken away and in section, showing the pan after the parts thereof have been straightened.

FIGURE 5 is a view taken at right angles to the view shown in FIGURE 4.

FIGURE 6 is a sectional view taken on the line 6—6 of FIGURE 5.

Referring in detail to the drawings, the numeral 10 indicates the adjustable die of the present invention which is shown to comprise a rectangular plate 11 that is provided with a plurality of oblong or non-circular openings 12 therein, FIGURE 6. Extending from the plate 11 and secured thereto as by welding is a bar 13, and a U-shaped clamp 14 is fixedly secured to the other end of the bar 13. The numeral 15 indicates a press which is connected to the clamp 14 as at 16, and the press 15 is of conventional construction and may be operated by any suitable mechanism, as for example by means of hydraulic pressure or the like.

The die 10 further includes four adjustable blocks, and these blocks are shown in FIGURE 3 to comprise a pair of elongated blocks 17 and a pair of shorter blocks 18. The pair of blocks 17 are arranged in opposed diagonal relation with respect to each other, while the blocks 18 are interposed between the pair of blocks 17.

The blocks 17 and 18 are provided with vertically disposed threaded apertures 19, and the numeral 20 indicates vertically disposed securing elements such as bolts, and the securing elements 20 each have a portion thereof extending through a corresponding opening 12 in the plate 11 and threadedly engaging the aperture 19 in the corresponding block. Each securing element 20 further includes an enlarged head 21 which may be knurled and which may be provided with a suitable kerf or slot so as to receive the tip of a screw driver or the like. A washer 22 is interposed between the head 21 and plate 11, as for example as shown in FIGURES 4 and 5.

The numeral 23 indicates a pan such as a bread pan or bakery pan which has bent or rough portions 24 that are to be straightened. As shown in the drawings, the blocks 17 and 18 are arranged in rectangular formation and these blocks are adjustable so that pans 23 of different sizes or shapes can be straightened. The blocks have flat bottom surfaces 25, as well as flat inner portions 26. However, the outer side and end portions of the blocks are inclined or beveled as at 27 so as to conform to the inclined sides and ends of the pan 23.

The blocks 17 and 18 are provided with alined registering apertures 28 which are horizontally disposed, and screw members or bolts 29 are arranged in engagement with these apertures 28 for adjustably connecting the blocks together. As shown in FIGURE 3 for example, certain of these screw members are arranged at right angles with respect to each other and the apertures 28 are arranged in different planes or levels with respect to each other so as to provide the necessary clearance. The screw members 29 are provided with enlarged heads 30 which are seated in countersunk recesses 31, and these heads 30 may be engaged by a suitable tool such as an Allen wrench or the like.

Interposed between the blocks 17 and 18 are shims or inserts 32, and these inserts 32 have the same cross section or configuration as the blocks. Thus, the inserts 32 have flat bottom surfaces 33 and inclined outer edge portions 34.

From the foregoing, it is apparent that there has been provided an adjustable die which is especially suitable for use in straightening out members such as bakery pans or the like. However, it is to be understood that the present invention is not restricted to the straighting of bakery articles or pans since it can be used for working on or straightening out other types of articles or devices.

The die 10 of the present invention is adapted to be attached to a conventional press such as the press 15, and the press 15 may be of the type which is reciprocated or moved back and forth so as to exert the necessary pressure on the article 23 to be straightened. After a pan such as the pan 23 has been used, it often develops rough or bent portions such as the portions 24 and with the present invention such rough portions can be straightened out so that the pan can be used over and over again in an advantageous or efficient manner. The plate 11 of the die is provided with the elongated openings 12, and the securing elements 20 extend through these openings 12 and threadedly engage the blocks 17 and 18. Thus, by loosening the securing elements 20, the oblong openings 12 permit the blocks to be adjusted to the desired position. Furthermore, the screw members 29 can be rotated so as to move the blocks 17 and 18 towards or away from each other, and the inserts 32 are provided so that by varying the number of inserts 32, pans of different sizes can be worked on or straightened. Relative movement of the blocks 17 and 18 is obtained because the screw members 29 are not in threaded engagement with the block having the recess 31 in each instance and rather rotate therein without moving the block. They must, of course, have threaded engagement with the lengthwisely or widthwisely aligned block. The blocks as well as the inserts have flat bottoms as well as inclined outer portions which will conform to the configuration of the usual pan 23. The countersunk recesses 31 insure that the heads 30 of the screw members 29 will not protrude out beyond the ends or sides of the blocks so that there will be no interference with proper usage of the die.

The parts can be made of any suitable material and in different shapes or sizes.

FIGURES 1 and 2 illustrate the position of the parts before the bent portions 24 are straightened out, while FIGURES 4 and 5 show the pan after the bent portions 24 have been flattened out or straightened out by the die of the present invention.

The adjustability of the die is obtained by having the metal washer 22 beneath each of the heads 21 of the bolts 20 and this in turn allows an expansion of the four solid pieces 17 and 18 with the shims 32. The off center washers 22 thus provide an important aspect or part of the present invention.

As shown in FIGURE 3 for example, the two long solid blocks or pieces 17 are not placed adjacent to each other but are arranged in diagonal opposed relation since by placing one of the short blocks next to a long block, greater strength is achieved.

The adjustable die is adapted to be used in conjunction with a conventional hydraulic press such as the press 15 for the purpose of straightening cake and bread bakery pans, as previously stated. The screw members or bolts 29 are arranged in a horizontal plane, and certain of these screw members 29 are arranged at right angles with respect to each other. The plate 11 holds the parts in place and the inserts are used as the blocks are expanded or contracted.

The tool or die of the present invention is especially suitable for use in straightening bread pans and it can be adjusted in different directions and the number of inserts can be varied as desired. The tool is highly flexible due to its adjustability so that it is not necessary to have a separate tool for each bread pan since this one tool will adjust to fit all sizes.

Minor changes in shape, size and rearrangement of details coming within the field of invention claimed may be resorted to in actual practice, if desired.

I claim:

1. In an adjustable die for straightening bakery pans and the like; a rectangular plate greater in length than width and provided with a plurality of spaced apart, oblong openings in the corners thereof of greater length than width; means for mounting said plate to a press; a set of four corner blocks arranged in rectangular formation below said plate, said blocks having flat bottoms and in assembled rectangular formation having inclined outer sides and end faces; there being vertically disposed threaded apertures in each of said blocks communicating with said openings; vertical securing elements with enlarged heads, having portions of materially smaller diameter than the size of said oblong openings in the widthwise and lengthwise directions extending through the openings in said plate and movable in said openings in either a widthwise or lengthwise direction, threadedly engaging in the threaded vertical openings in said blocks; there being also horizontally disposed lengthwise registering apertures in said blocks and horizontally disposed registering widthwise apertures in said blocks in alignment in adjacent blocks at a different horizontal level than said lengthwise apertures; horizontally disposed screw members, with enlarged heads, arranged in threaded engagement with certain of said horizontally disposed apertures to have threaded engagement with one of each pair of aligned lengthwise and widthwise openings in adjacent blocks and hold said blocks in definite, fixed, adjusted relative positions; said set of blocks including a first pair of elongated blocks and a second pair of shorter blocks, said elongated blocks being arranged in opposed diagonal relation with respect to each other and said shorter blocks also being arranged in opposed diagonal relation to each other.

2. The combination defined in claim 1 in which off center washers are employed between said rectangular plate and the enlarged heads of said vertical securing elements.

References Cited in the file of this patent

UNITED STATES PATENTS

| | | |
|---|---|---|
| 271,388 | Williams et al. | Jan. 30, 1883 |
| 996,601 | Ames | July 4, 1911 |
| 1,573,810 | Cunningham | Feb. 23, 1926 |
| 2,748,735 | Slaten | June 5, 1956 |
| 2,799,319 | Alcorn | July 16, 1957 |
| 2,830,643 | Harris | Apr. 15, 1958 |